(12) United States Patent
Henry (10) Patent No.: US 7,445,271 B1
(45) Date of Patent: Nov. 4, 2008

(54) TRUCK SLEEPER

(76) Inventor: David J. Henry, 11559 County Rd. 6 P.O. Box 367, Brooten, MN (US) 56316

( * ) Notice: Subject to any disclaimer, the term of this patent is extended or adjusted under 35 U.S.C. 154(b) by 0 days.

(21) Appl. No.: 11/849,585

(22) Filed: Sep. 4, 2007

Related U.S. Application Data (62) Division of application No. 11/249,292, filed on Oct. 12, 2005, now Pat. No. 7,263,754.

(51) Int. Cl.
*B62D 33/06* (2006.01)

(52) U.S. Cl. .................. 296/190.02; 296/26.02

(58) Field of Classification Search ............ 296/190.01, 296/190.02, 190.08, 190.1, 99.1, 26.02; 5/118; D12/99, 96; 180/89.12
See application file for complete search history.

(56) References Cited

U.S. PATENT DOCUMENTS

| | | | | |
|---|---|---|---|---|
| D236,606 S * | 9/1975 | Bodden | ...................... | D12/96 |
| D248,846 S * | 8/1978 | Stage et al. | ................ | D12/404 |
| D249,495 S * | 9/1978 | Wallace et al. | ............... | D12/99 |
| D272,058 S * | 1/1984 | Kangas | ..................... | D12/404 |
| 4,436,177 A * | 3/1984 | Elliston | ...................... | 180/324 |
| D316,531 S * | 4/1991 | Karapetian | ................... | D12/99 |
| D320,583 S * | 10/1991 | Simons et al. | ............... | D12/96 |
| 5,083,834 A * | 1/1992 | Moffatt et al. | ........... | 296/26.02 |
| 5,310,239 A * | 5/1994 | Koske et al. | ............. | 296/26.08 |
| 5,560,673 A * | 10/1996 | Angelo | ..................... | 296/26.02 |
| 6,276,748 B1* | 8/2001 | Gobessi et al. | ......... | 296/190.02 |
| 6,692,062 B1* | 2/2004 | Woodard et al. | ............ | 296/164 |
| D529,411 S * | 10/2006 | Fairbairn | ..................... | D12/96 |
| 2004/0080181 A1* | 4/2004 | Puterbaugh et al. | .... | 296/190.01 |
| 2004/0080182 A1* | 4/2004 | Adams et al. | .......... | 296/190.02 |
| 2005/0242622 A1* | 11/2005 | Myers et al. | ........... | 296/190.02 |
| 2006/0197360 A1* | 9/2006 | Frazier et al. | .......... | 296/190.08 |

* cited by examiner

*Primary Examiner*—Jason S Morrow
(74) *Attorney, Agent, or Firm*—Albert W. Watkins (57) ABSTRACT

A truck cab and sleeper unit are extended using a preferred stepped aerodynamic roof which at a first ceiling level corresponds to the original sleeper unit ceiling height, and which at a second ceiling level corresponds to the original sleeper unit ceiling height plus the height difference between the truck cab height and the original sleeper unit ceiling height. The original sleeper roof may be used, or a new unitary roof may be fabricated. The apparatus and method of the invention preserve all or most of the components of an original sleeper unit, while enabling rapid conversion comparable to the full replacement of the prior art.

9 Claims, 6 Drawing Sheets

TRUCK SLEEPER

CROSS REFERENCE TO RELATED APPLICATIONS

The present application is a divisional application of parent application Ser. No. 11/249,292 filed Oct. 12, 2005 now U.S. Pat. No. 7,263,754 of like title and inventorship, the contents which are incorporated herein by reference in entirety.

BACKGROUND OF THE INVENTION

1. Field of the Invention

This invention pertains generally to land vehicle bodies and tops, and more particularly to operator's cabs having sleeping accommodations. Most particularly, one manifestation of the invention enables expansion of a sleeper cab while preserving the appearance and a majority of the components of the original sleeper cab.

2. Description of the Related Art

Modern society depends upon the free exchange of goods, not only in a local community but throughout nations and between nations. Experience suggests that with free exchange comes prosperity, while barriers harm all citizens. A century and more ago, civilizations relied upon ships to transport goods across water, and horse-drawn wagons to transport goods across land. Unfortunately, transport across large distances took much time and money. In the case of water, while the ships may not have traveled particularly quickly, they were capable of carrying many tons of cargo at a time, making the costs relatively small per unit of cargo. Transport across land was quite different, since each horse-drawn wagon was very limited in capacity. Furthermore, land transport across large distances was in many cases essentially impossible, due to natural land barriers such as deserts and mountains. As a result, large populations developed where good access to the seas existed, while many inland areas remained sparsely populated.

With the advent of the railroads, goods were able to be transported in large quantity from sea ports inland to all points along the tracks, and the amount of time in transit was greatly decreased from horse-drawn wagons. The railways provided a means for distribution to many more locations than could be achieved previously, allowing for population growth and development in previously remote inland areas.

Unfortunately, much time was still required to haul goods to and from the stops along the rail. Consequently, development continued to be centered adjacent to the rail stops, leaving much to be desired in terms of final distribution. A major advancement came with the development of large trucks, and roadways capable of supporting these trucks. For the first time, goods could be transported directly from a source location to a final destination, both in large quantity and quickly, anywhere across the land where a roadway existed.

Early trucks simply coupled an operator cab to the cargo container. In fact, many such trucks are still in use today. However, longer transport distances are frequently required, taking more time than a single day. Such travel leads to the driver frequenting hotels and motels along the travel route. As many travelers know, hotels and motels vary from location to location, and from one visit to the next. Furthermore, the cost of staying in hotels and motels on a nightly basis accumulates over time into substantial cost over and above the other transportation costs. Finally, depending upon the route and such unpredictable factors as weather and road construction, a hotel or motel may not always be available where desired or required.

In consideration of the costs and unpredictability of hotels and motels, trucks have been fitted with a sleeper cab which provides a sleeping space for an operator. For over-the-road drivers, these sleeper cabs ensure suitable space for truly restful sleep, and are certain to be available to the driver whenever needed. In addition to providing a predictable place for rest, the sleeper cab has permitted drivers to pair up, so that one driver may be sleeping while another is driving. In this way, long distance transport times may be significantly reduced, further advancing the exchange of goods and services, and in turn boosting prosperity.

As might be expected, the inclusion of a sleeper cab has additional consequence. The sleeper cab adds cost to the truck, and so must be used sufficiently over the life of the truck to pay the extra cost. Consequently, it makes little sense to include a sleeper cab in a truck primarily used for local delivery. Instead, these cabs have been reserved for trucks which are used for relatively longer distance hauling. However, with the inclusion of a sleeper cab, a driver also spends much more time in the truck, and has less access to other common amenities, such as showers, toilets, television, and the like that most people take for granted.

For the over-the-road drivers that spend even greater amounts of time on longer routes, more elaborate sleeper cabs have been devised that include essentially all of the amenities that may be found in a typical hotel or motel room. Furthermore, these sleeper cabs are, once again, available at any time, and are always predictable. For long-distance drivers, these more elaborate sleeper cabs can be a great blessing. A good night of rest can only help improve the safety of the driver. The time and expense for transporting a load can be reduced. Both contribute to the overall prosperity of an economy.

As might be appreciated, when more amenities are provided in the relatively limited space available even in a double long sleeper cab, such amenities will most frequently be desired to be custom to suit the needs and desires of a particular driver or driving team. Consequently, the major truck manufacturers cannot produce stock double-long sleepers to meet the custom needs of each driver. Instead, the truck manufacturers produce the rig together with an optional, much more basic, single-length sleeper cab, which provides a sleeping space, often with sufficient room for a small television, stereo or other small appliances and conveniences. As aforementioned, such basic sleepers are more than adequate for drivers that are carrying a mix of local and longer distance loads, and for newer owner-operators that cannot afford a more expensive custom rig.

The challenge comes when an owner wishes to upgrade from a stock sleeper to a custom extended-length sleeper cab. In the industry today, custom sleepers are assembled separate from the truck. The existing sleeper cab is removed and scrapped, and the custom sleeper is placed upon the truck. The economics made possible by separately manufacturing the sleeper commonly outweigh the cost of scrapping the stock sleeper. Further, the pre-manufacture of the sleeper box reduces the amount of time required for installation. As with other industries, time is money. Finally, some of the fabrication techniques utilize a single, integrated assembly, without separate fasteners or other components. Consequently, alterations are not possible in those constructions. As may be appreciated, this approach leads to undesirable waste of the existing sleeper.

A number of patents illustrate the various current fabrication and assembly techniques used with modern sleeper cabs.

U.S. Pat. No. 4,121,684 by Stephens et al, entitled "Truck with tilting cab and non-tilting separated sleeping compartment," the contents which are incorporated herein by reference, describes a sleeper that mates with a sealing surface at the rear of the cab when the cab is in operational position. U.S. Pat. No. 4,436,177 by Elliston, entitled "Truck operator's cab with equipment control station," the contents which are incorporated herein by reference, describes a sleeper compartment modified to include a control station in its aft end. U.S. Pat. No. 5,083,834 by Moffatt et al, entitled "Truck sleeper cab"," the contents which are incorporated herein by reference, describes a composite sleeper module to mount behind the truck cab, with a flexible sealing interface between sleeper and cab. U.S. Pat. No. 5,310,239 by Koske et al, entitled "Modular cab and sleeper structural assembly for a truck-tractor vehicle," the contents which are incorporated herein by reference, describes independent cab and sleeper assemblies with couplings to reduce the likelihood of damage to both. U.S. Pat. No. 5,560,673 by Angelo, entitled "Truck cab and sleeper assembly," the contents which are incorporated herein by reference, describes a cab to sleeper interface using bolt-together construction with a sealing gasket. U.S. Pat. No. 5,769,486 by Novoa et al, entitled "Truck roof mounting system," the contents which are incorporated herein by reference, describes a roofing system that uses a modular roof assembly to cover cab and sleeper. U.S. Pat. No. 6,682,129 by Baggett et al, entitled "Flare module truck sleeper cab assembly," the contents which are incorporated herein by reference, describes making a flared sleeper using many of the same body components used in a standard width sleeper. Left and right side flare modules are used to extend the sleeper outward. Finally, Des 320,583 by Simons et al, entitled "Combined truck cab body and sleeper compartment," the contents which are incorporated herein by reference, illustrates a prior art stock sleeper cab.

Undesirably, the custom sleeper will invariably look like a retrofit, significantly changing the appearance of the truck. In some instances, an owner will welcome the change in appearance. However, particularly where an owner has made a substantial investment in a high quality truck of desired appearance, such as a Kenworth brand truck or the like, the owner may not welcome the change in appearance that comes with the replacement custom sleeper. Unfortunately, no alternative exists in the industry today which can combine an OEM appearance with custom fabrication.

SUMMARY OF THE INVENTION

In a first manifestation, the invention is a method for extending a truck sleeper unit coupled to a truck cab and elevated to a ceiling a first distance above a ceiling of the truck cab. According to the method, an original roof having an original roof geometry is removed from the truck sleeper unit. A replacement roof, preserving the original roof geometry and adding a sleeper extension roof of like length and geometry to the original roof geometry that is elevated to a ceiling by the first distance above the original roof ceiling, is provided. The first and second side panels are extended farther from a back of the truck cab, thereby extending the truck sleeper unit. The replacement roof is then coupled to the first and second side panels and back panel to enclose the extended truck sleeper unit.

In a second manifestation, the invention is, in combination, a cover extension and a truck sleeper cover. The cover extension is operative to merge the surface of a sleeper extension to the surface of a sleeper of a truck while providing the outward appearance of a single extended sleeper attached to the truck. The truck sleeper cover has a base suitable for operative coupling with the truck sleeper, and side walls rising from the base a first vertical distance to a top of the truck sleeper cover that have a first aerodynamic geometric shape. The cover extension has a base suitable for operative coupling with the sleeper extension, and side walls rising from the base to a first height, and continuing from there by the first vertical distance to a cover extension top and having the first aerodynamic geometric shape in the region between the first height and a top of the cover extension.

In a third manifestation, the invention is, in combination, a sleeper extension attached to a truck cab sleeper unit and through the truck cab sleeper unit to a truck cab. A roof covering the sleeper extension steps in height corresponding to a step in height from a roof covering the truck cab to a roof covering the sleeper unit. The sleeper extension roof couples to the sleeper unit roof. A first side extension couples to a first side of the sleeper unit. A second side extension couples to a second side of the sleeper unit. A replacement rear wall is coupled to the first and second side extensions. The sleeper extension roof is coupled to the first and second side extensions and the replacement rear wall.

OBJECTS OF THE INVENTION

Exemplary embodiments of the present invention solve inadequacies of the prior art by providing a method for converting a truck tractor addition from a single-sleeper cab into a double-sleeper cab, while preserving most of the single-sleeper structure and enabling rapid and efficient retrofit.

A first object of the invention is to enable conversion of an existing stock single-length sleeper into a custom double-length sleeper. A second object of the invention is to preserve most of the components of the stock sleeper. Another object of the present invention is to preserve the appearance of the truck. A further object of the invention is to enable this conversion to be completed in very little more time than would be required for the complete sleeper compartment replacement of the prior art. Yet another object of the present invention is to maintain full access to the sleeper, and avoid the need for the restricted entrances or "dog holes" of the prior art, while also providing sufficient height for a person to comfortably stand in the sleeper conversion. An additional object of the invention is to provide an aerodynamic transition from a front grill of the truck to a semi-trailer. Another object of the invention is to provide a sleeper which fulfills the foregoing objectives and further provides an easily habitable space, allowing for an operator to stand completely therein.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
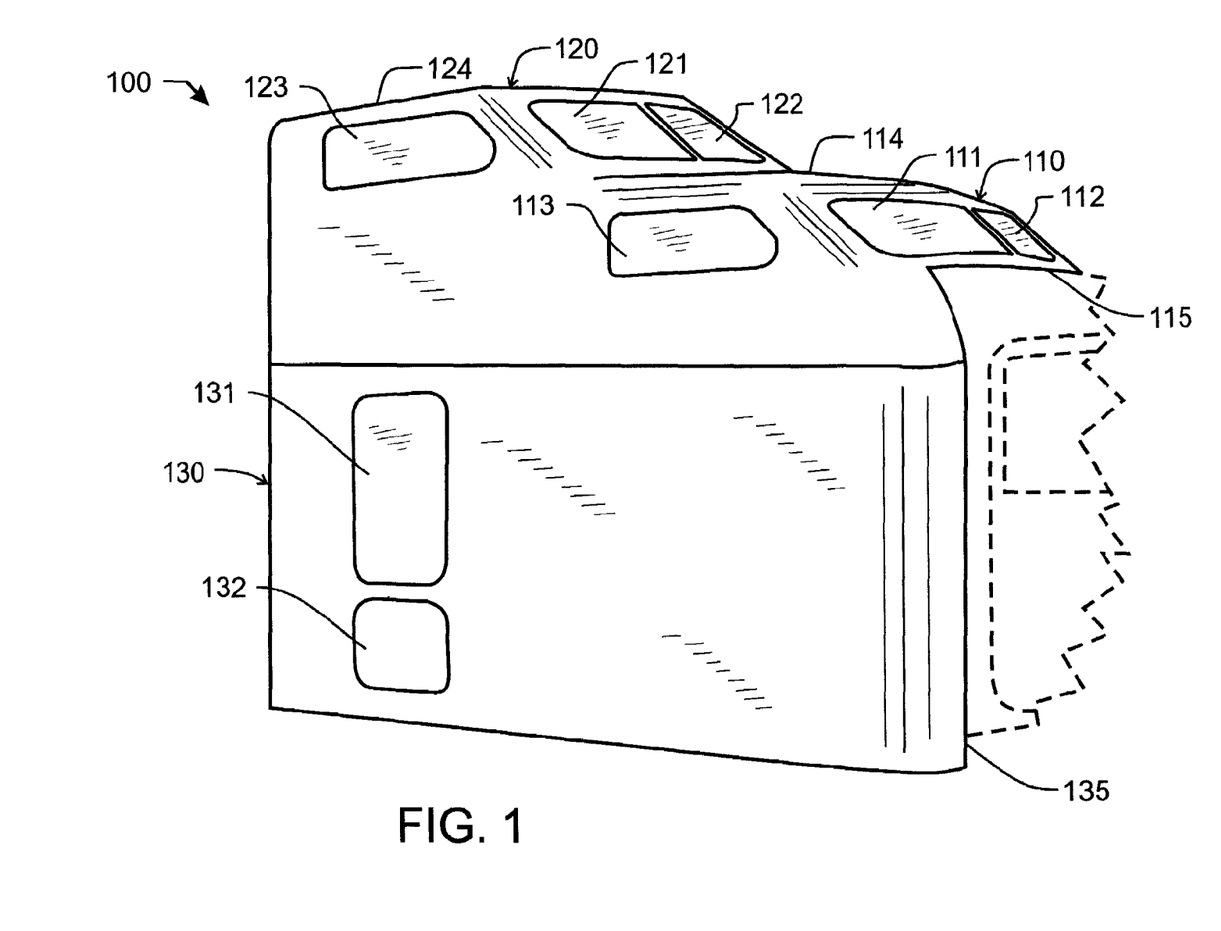
FIG. 1 illustrates a preferred embodiment double-length sleeper cab conversion designed and manufactured in accord with the teachings of the present invention, from a side projected view and showing a partial cut-away view of the truck cab by dashed line.
Figure 2:
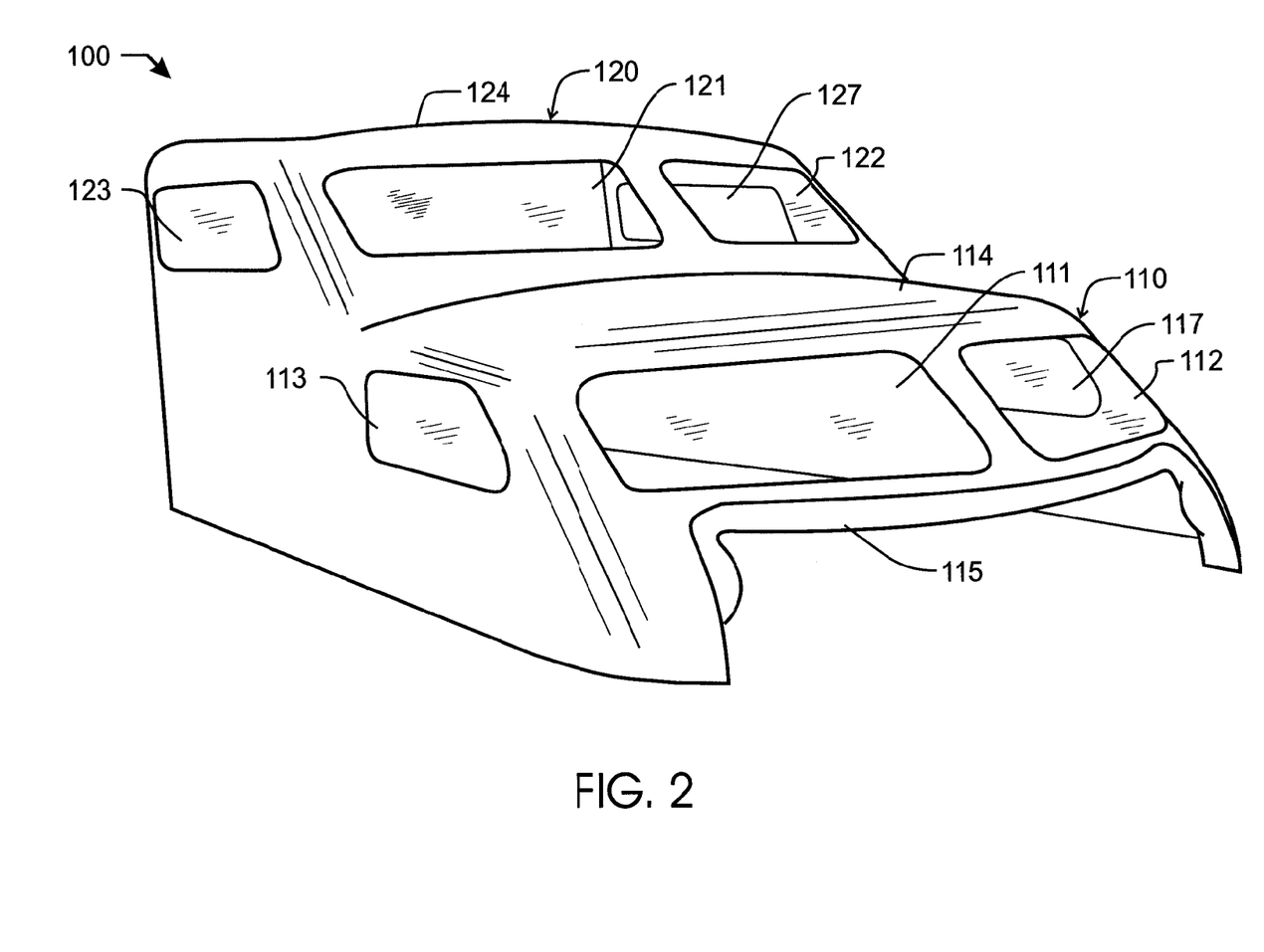
FIG. 2 illustrates a preferred roof used in the preferred embodiment double-length sleeper cab conversion of FIG. 1, from a projected view.

Manifested in the preferred and alternative embodiments described herein, the present invention provides a method and apparatus for converting a semi-tractor sleeper cab from a single-length sleeper cab 1 into a double-length sleeper cab 2, while preserving most of the single-length sleeper structure and enabling rapid and efficient retrofit. In accordance therewith, FIG. 1 illustrates a double-length sleeper 100, having an original truck sleeper cover 110, a truck sleeper cover extension 120, and a sleeper base 130, while FIG. 2 illustrates just original truck sleeper cover 110 and truck sleeper cover extension 120. It will be understood that, while original truck sleeper cover 110 and truck sleeper cover extension 120 are referred to as separate and distinct components, they may alternatively be fabricated in one single piece. Furthermore, the single piece may be fabricated either using an original truck sleeper cover 110 and bonding or otherwise coupling therewith, or a completely new cover may formed as a single, integral piece which includes all of the features of original truck sleeper cover 110 and truck sleeper cover extension 120. Finally, where desired, a combined truck sleeper cover 110, 120 may be fabricated with features different from those found on original truck sleeper cover 110. However, in such instance, it is highly desirable to preserve both the aerodynamic nature of the preferred embodiment and also preserve the appearance of an OEM single unit. As aforementioned, this combination offers significant benefit not only in aesthetic appearance, but also in the functional nature of the internal space and the aerodynamic efficiency of the exterior so formed. Where original truck sleeper cover 110 may be used, both the original appearance and as much material as possible will be preserved, and the weather-tight coupling 115 to truck cab 6 will also be preserved.

A sleeper side wall extension is most desirably merged with ordinary side walls of a truck sleeper, such as by fastener or suitable adhesive or other attachment, to form a large base 130 which comprises a large part of the side wall of the preferred double sleeper 100. When properly coupled, including to truck cab 6 through base seal 135, base 130 will most preferably provide the outward appearance of a single extended sleeper attached to a truck, and may, for exemplary purposes only and not limiting thereto, include access doors 131 and access panels 132 which appear identical to those found in the OEM model being converted. Cover extension 120 is operative in combination with original truck sleeper cover 110 to form a roof over truck sleeper base 130, having side walls rising from base 130 a first vertical distance to a top 114 of original truck sleeper cover 110. Most preferably, the side walls will have a generally aerodynamic geometric shape, which in later figures will be generally vertically side walls and a rearwardly climbing front face. Cover extension 120 has a lower edge suitable for operative coupling with base 130, and side walls rising from the lower edge to a first height, and continuing from there by the first vertical distance to a cover extension top 124. Most preferably, cover extension 120 will also have an aerodynamic geometric shape in the region between the first height, at the level of top 114, and a top 124 of the cover extension. Cover extension top 124 will most preferably be at a height close to the height of a semi-trailer top, such that air streams passing over windows 111, 112, 121, 122 will be directed over the semi-trailer top, thereby reducing air drag. The combination of sloped forward faces of original truck sleeper cover 110 and truck sleeper cover extension 120, which are primarily comprised by windows 111, 112, 121, 122, serve as a very beneficial fairing, reducing undesirable eddy currents and wasted energy as a truck travels through the air. Where additional side windows 113, 117 are provided on original truck sleeper cover 110, truck sleeper cover extension 120 may also be provided with similar side windows 123, 127.

Most desirably, cover extension top 124 steps in height above top 114 corresponding to a step in height from the roof 7 covering truck cab 6 to top 114 covering the sleeper unit. Furthermore, most desirably, any windows such as windows 111, 112, 113, 117 and other adornments such as lights 118 will be reproduced onto truck sleeper cover extension 120, to yield windows 121, 122, 123, 127 and lights 128. When properly duplicated in accord with the present invention, double sleeper 100 will have the appearance of a factory installation, mirroring even windows 3,4 and lights 8. The additional height under cover extension 120 will not only offer improved aerodynamics during travel, but will also provide highly desired additional space, including sufficient headroom for most persons to stand comfortably. In situations where modern over-the-road drivers spend many hours in a row within truck cab 6 or double sleeper 100, this extra height can be a tremendous benefit.

Figure 3:
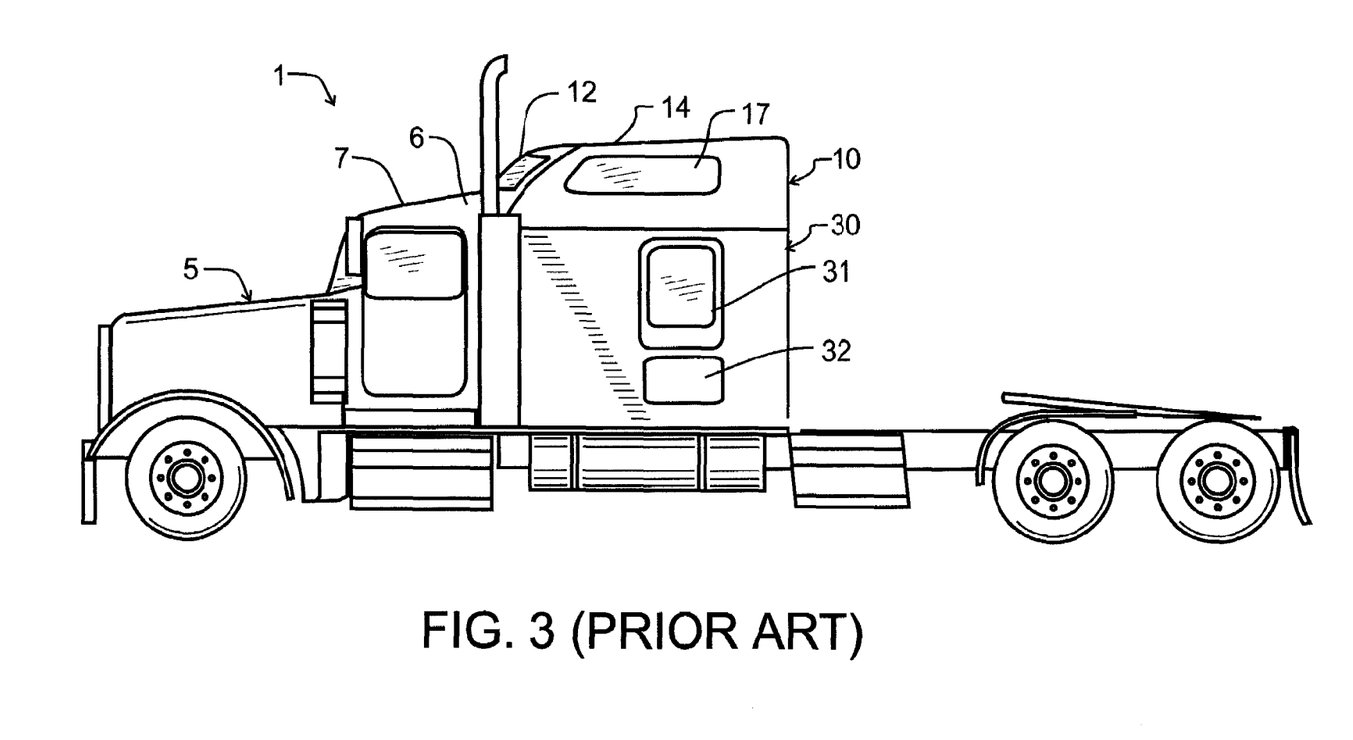
FIG. 3 illustrates a prior art semi-tractor and single-length sleeper cab from side plan view.
Figure 4:
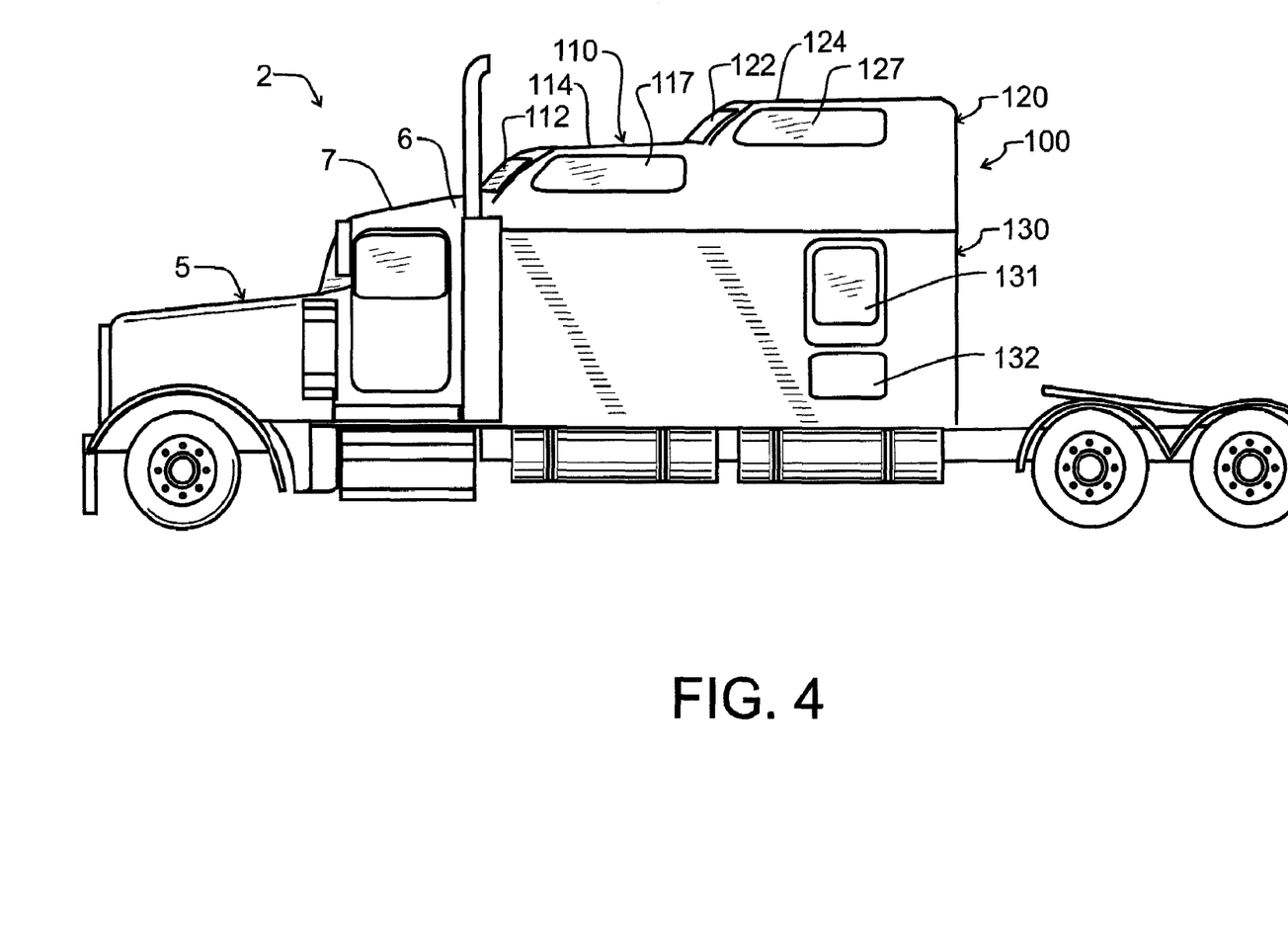
FIG. 4 illustrates the preferred embodiment double-length sleeper cab conversion of FIG. 1 from side plan view.
Figure 5:
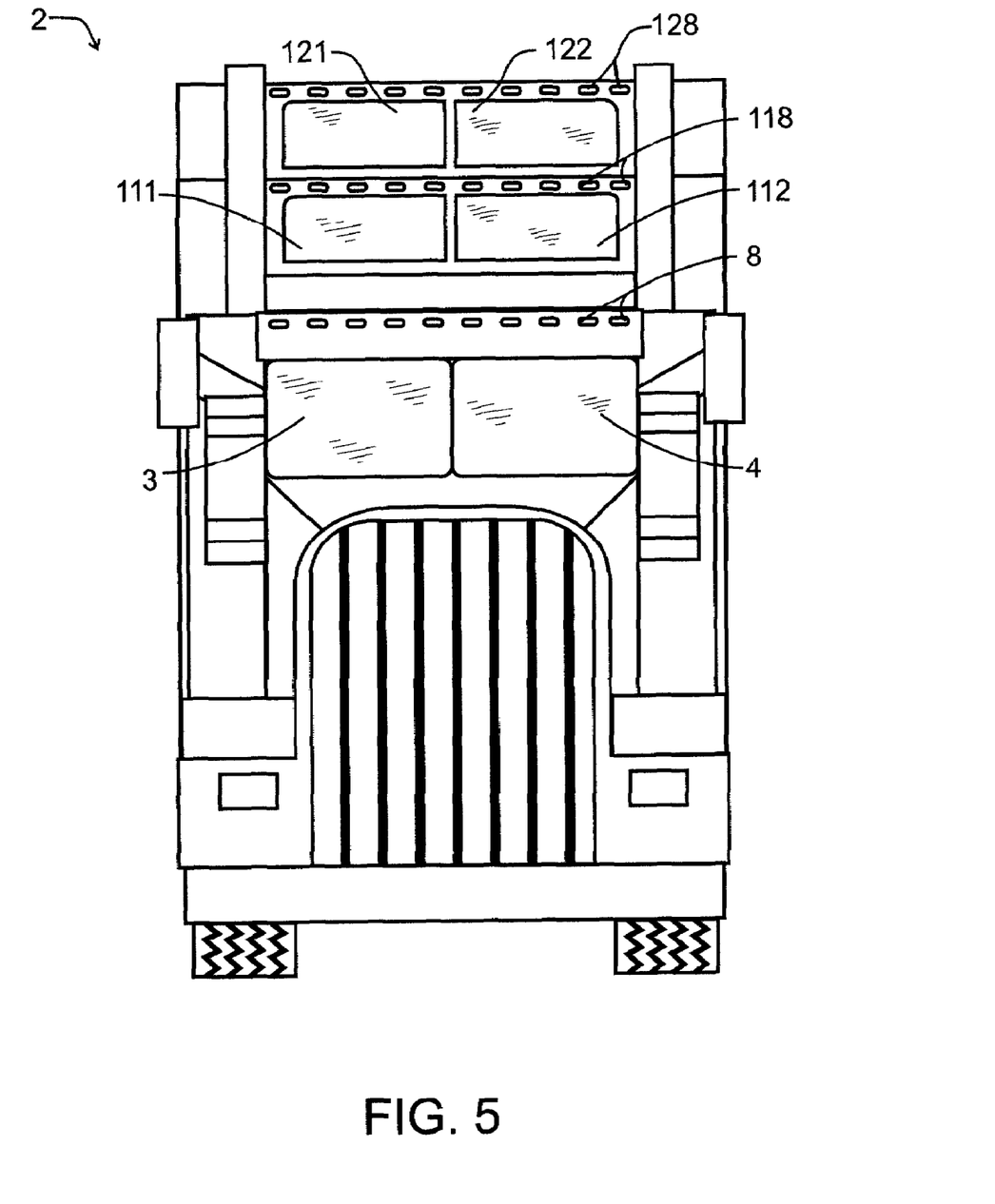
FIG. 5 illustrates the preferred embodiment double-length sleeper cab conversion of FIG. 1 from front plan view.
Figure 6:
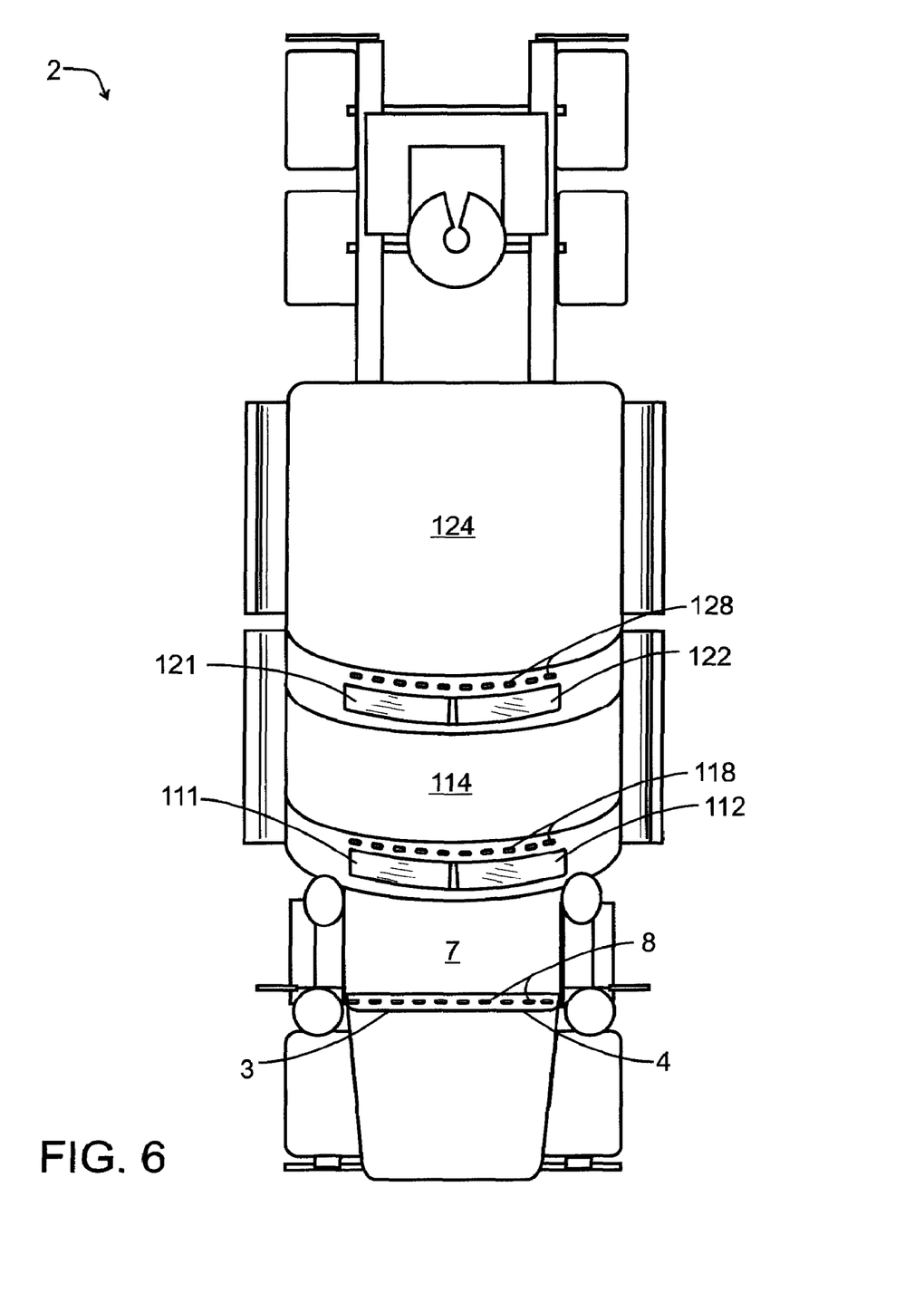
FIG. 6 illustrates the preferred embodiment double-length sleeper cab conversion of FIG. 1 from top plan view.

According to a preferred method for converting a prior art single-length sleeper cab 1, which includes in combination a truck 5 combined with sleeper cab 10, 30 as shown in FIG. 3, into a double-length sleeper cab 2, as shown in FIGS. 4-6, the original truck sleeper cover 10, as shown in prior art FIG. 3, is removed from truck sleeper base 30. Next, a replacement roof 110, 120 is provided that preserves the original truck roof geometry and adds a sleeper extension roof 120 of like length and geometry to the original roof 110 geometry. The replacement roof 110, 120 will most preferably be elevated to a sleeper extension ceiling 124 that is above the original roof ceiling 114 by a first distance which is equal to or approximate with the distance of elevation from the truck cab roof 7 to the truck original roof ceiling 14. If necessary to accommodate a longer sleeper cab, the main longitudinal beams of the truck, which extend from front axle under the truck cab 6 and sleeper base 30, 130 to the rear dual wheels, may be extended. The two side panels of sleeper base 30 are extended farther from a back of the truck cab, thereby extending the truck sleeper base 130. Most preferably, sections that include doors 31 and access panels 32 will be moved back to form doors 131 and access panels 132, and new sidewall sections placed forward. A back panel that is already attached to the first and second side panels is preferably left connected therewith, and the extension is desirably achieved through the insertion of spacers adjacent to truck cab 6. The replacement roof 110, 120 is then coupled to the side panels and back panel to complete the enclosure of double-length sleeper 100. Finally, double-length sleeper 100 is affixed to truck cab 6, most preferably using resilient and removable couplings such as 115, 135, and as known and described for exemplary purposes in U.S. Pat. No. 5,560,673 to Angelo, the teachings which were incorporated herein above by reference.

The materials used in the practice of the invention are not critical, so long as they are selected for the necessary durability and weather resistance that will be associated with over-the-road travel. Most noteworthy is the need for a selection of fasteners, adhesives or the like which are not readily freed by vibration, since over-the-road vehicles will typically be extensively vibrated. Similarly, the materials used throughout should be both temperature and fatigue resistant. Nevertheless, a wide range of metals, alloys, plastics, ceramics, glasses, composites and the like are available and will be recognized as suitable by one reasonably skilled in the art.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a cover extension and a truck sleeper cover, said cover extension operative to merge the surface of a sleeper extension to the surface of a sleeper of a truck while providing the outward appearance of a single extended sleeper attached to said truck,
    said truck sleeper cover comprising:
        a base suitable for operative coupling with said truck sleeper; and
        side walls rising from said base a first vertical distance to a top of said truck sleeper cover and having a first aerodynamic geometric shape;
    said cover extension comprising:
        a base suitable for operative coupling with said sleeper extension;
        side walls rising from said base to a first height, and continuing from there by said first vertical distance to a cover extension top and having said first aerodynamic geometric shape in said region between said first height and a top of said cover extension.

2. The combination cover extension and truck sleeper cover of claim 1, wherein said truck sleeper cover further comprises a plurality of windows formed in said side walls having a first dimension and placement relative to said side walls; and said cover extension further comprises a plurality of windows formed in said side walls having said first dimension and placement relative to said side walls, but offset vertically above and by the amount of said first height.

3. The combination cover extension and truck sleeper cover of claim 1, wherein said truck sleeper cover further comprises a plurality of electric lights attached to said side walls having a first dimension and placement relative to said side walls; and said cover extension further comprises a plurality of electric lights attached to said side walls having said first dimension and placement relative to said side walls, but offset vertically above and by the amount of said first height.

4. The combination cover extension and truck sleeper cover of claim 1 where said cover extension and truck sleeper cover are unitary.

5. The combination cover extension and truck sleeper cover of claim 1 where said truck sleeper cover consists of at least one separable part and is not formed unitarily with said cover extension, said truck sleeper cover mating with both said sleeper extension and said truck sleeper.

6. The combination cover extension and truck sleeper cover of claim 1 where said truck sleeper cover is sealed to said sleeper with an elastomeric seal providing resistance to moisture entry, having at least one surface of said elastomeric seal not bonded with at least one of said truck sleeper cover, said sleeper, and said sleeper extension.

7. In combination, a sleeper extension attached to a truck cab sleeper unit and through said truck cab sleeper unit to a truck cab, comprising:
    a roof covering said sleeper extension stepping in height corresponding to a step in height from a roof covering said truck cab to a roof covering said sleeper unit, said sleeper extension roof coupled to said sleeper unit roof;
    a first side extension coupled to a first side of said sleeper unit;
    a second side extension coupled to a second side of said sleeper unit;
    a rear wall coupled to said first and second sides;
    said sleeper extension roof coupled to said first and second side extensions and said rear wall.

8. The combination sleeper extension, truck cab sleeper unit, and truck cab of claim 7 further comprising:
    at least one light-admitting panel in said sleeper unit roof between a top of said truck cab sleeper unit and a top of said truck cab;
    at least one light-admitting panel in said sleeper extension of like shape to said at least one sleeper unit light-admitting panel and located between a top of said truck cab sleeper unit and a top of said sleeper extension.

9. The combination sleeper extension, truck cab sleeper unit, and truck cab of claim 7 further comprising:
    at least one electric light in said sleeper unit roof between a top of said truck cab sleeper unit and a top of said truck cab;
    at least one electric light in said sleeper extension of like shape to said at least one sleeper unit electric light and located between a top of said truck cab sleeper unit and a top of said sleeper extension.

* * * * *